United States Patent
Perlo et al.

(10) Patent No.: US 6,486,790 B1
(45) Date of Patent: Nov. 26, 2002

(54) WHITE-LED LUMINOUS SIGNALLING DEVICE

(75) Inventors: Piero Perlo, Sommariva Bosco (IT); Piermario Repetto, Turin (IT); Silvia Farina, Orbassano (IT); Daniele Pullini, Orbassano (IT); Vito Lambertini, Giaveno (IT)

(73) Assignee: C.R.F. Societa Consortile Per Azioni, Turin (IT)

( * ) Notice: Subject to any disclaimer, the term of this patent is extended or adjusted under 35 U.S.C. 154(b) by 0 days.

(21) Appl. No.: 09/717,024

(22) Filed: Nov. 22, 2000

(30) Foreign Application Priority Data

Nov. 26, 1999 (IT) .......................................... TO99A1038

(51) Int. Cl.⁷ ................................................ G08B 5/22
(52) U.S. Cl. ............................. 340/815.45; 340/815.56; 340/815.65; 340/321; 340/330; 340/332; 356/601; 359/707; 362/800; 362/812
(58) Field of Search ...................... 340/815.45, 815.56, 340/815.65, 330, 332, 321; 356/601; 359/707; 362/800, 812

(56) References Cited

U.S. PATENT DOCUMENTS

| 4,141,058 | A | * | 2/1979 | Mizohata et al. .............. 362/32 |
| 5,896,093 | A | * | 4/1999 | Sjobom .................. 340/815.75 |
| 6,215,409 | B1 | * | 4/2001 | Blach ....................... 340/815.4 |
| 6,294,983 | B1 | * | 9/2001 | Lee .............................. 340/332 |

* cited by examiner

*Primary Examiner*—Julie Lieu
(74) *Attorney, Agent, or Firm*—Sughrue Mion, PLLC

(57) ABSTRACT

A luminous signalling device comprises a body made of transparent synthetic material, basically in the form of a plate having two larger faces set opposite one another, at least one of which carries an image. A plurality of LED devices of the SMD type which emit white light is coupled externally to at least one of the walls that define the peripheral edge of the aforesaid plate body. The arrangement is such that the rays of white light coming out of the LED devices undergo multiple total reflections within the plate body, which thus functions as a light guide. In areas corresponding to selected areas of the image, the face of the plate body is made up of diffusing optical elements designed to diffuse outwards the rays of light that are incident on said areas within the body.

15 Claims, 2 Drawing Sheets

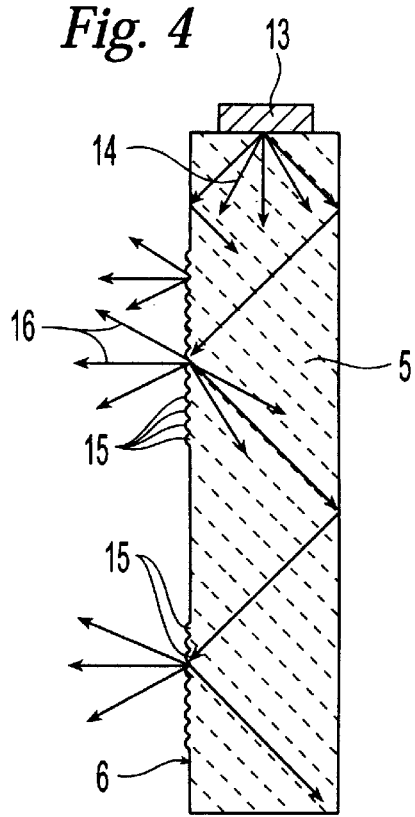
Fig. 4
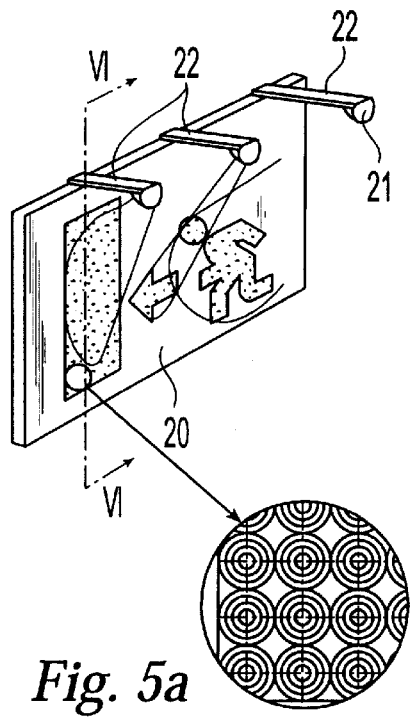
Fig. 5
Fig. 5a
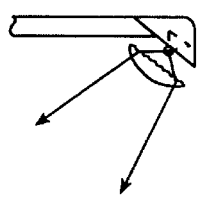
Fig. 6a
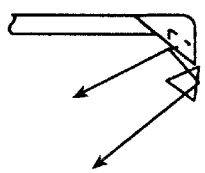
Fig. 6b
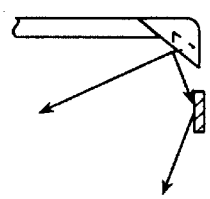
Fig. 6c
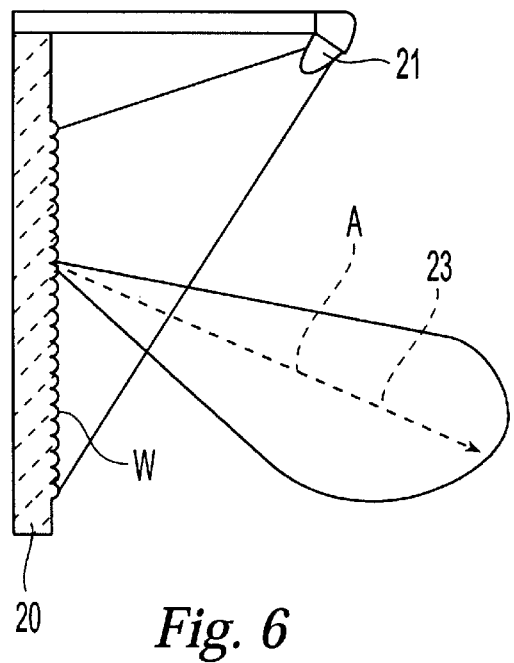
Fig. 6

WHITE-LED LUMINOUS SIGNALLING DEVICE

BACKGROUND OF THE INVENTION

The present invention relates to luminous signalling devices, for instance luminous signalling panels of the type illustrated in FIG. 1 of the attached drawings. Panels of this type are contemplated in the safety standards currently in force for indicating, for example, emergency exits from premises.

According to traditional techniques, the luminous panels of the type illustrated in FIG. 1 have a hollow supporting body containing inside a light source, for example a phosphorescent lamp, for the backlighting of the face of the panel bearing the image that is to be displayed.

SUMMARY OF THE INVENTION

The purpose of the present invention is to provide a luminous signalling device which, as compared with known devices, has a far more compact and simple structure and a more efficient operation.

With a view to achieving the above purpose, the subject of the invention is a luminous signalling device comprising:
- a body made of transparent synthetic material, basically in the form of a plate having two larger faces set opposite to one another, at least one of which bears an image, two end walls, and two longitudinal walls;
- a plurality of LED devices, some of which designed to emit white light, and others designed to emit green light, externally coupled to at least one of said end walls or said longitudinal walls, the arrangement being such that the rays of light coming out of said LED devices undergo multiple total reflections within the plate, which thus functions as a light guide; and
- a distribution of diffusing, diffractive optical elements formed on the face bearing the image in areas corresponding to selected areas of the image designed to diffuse outwards the rays of light that are incident on said areas from within the plate.

The above-mentioned plate body may, for example, be made of polymethyl methacrylate or polycarbonate. LEDs (light-emitting diodes) that emit white light have been developed in relatively recent years in a form usable at an industrial scale. Particularly suitable for the purposes of the invention are the models NSCW 100 and NSSW 440 manufactured by the Company NICHIA. These white-light emitting diodes typically have the structure illustrated in FIG. 3 of the attached drawings. The LED proper, designated by 1, is set at the bottom of a cavity 2 made in a support 3 and filled with an epoxy resin matrix 4 englobing multicolour phosphors. The LED 1 is designed to emit blue light with a short wavelength but, following on interaction with the phosphors in the resin 4, the light rays emitted by the device are white-light rays. As indicated above, according to the invention a plurality of white-LED devices of the surface-mounted device (SMD) type, that is, a type suited for being mounted on a surface, is arranged. The various LEDs associated to a wall of the plate body of the device may be supplied by means of a channel and may be rendered adherent to the plate by means of a polymer layer having the additional function of improving LED/plate coupling. The aforesaid diffusing optical elements arranged in areas corresponding to selected areas of the image carried on one or on both of the faces of the plate body may, for example, be diffractive lenses or micro-refractive lenses. These diffusing optical elements are made by moulding or pressing (for instance, by injection-moulding or by a hot-pressing process) on the face of the plate body.

In the typical case exemplified in FIG. 1 of the annexed drawings, in which the image to be displayed presents a lighter-coloured shape on a darker background, for instance a white shape on a green background, the aforesaid diffusing optical elements are formed in areas corresponding to the light-coloured shape. However, it is also possible to arrange optical elements also in areas corresponding to the dark background of the image, differentiating the optical elements from one another so as to control the respective luminances. The image may be obtained on the face of the plate body, for example by means of silkscreen printing.

The device according to the invention may be made like a flag, with the image on both of the larger faces, or else also with the image on a single face. In the latter case, the opposite face is provided with a reflecting coating. The white LEDs may be arranged on a single wall of the plate body, or on two opposite walls of the plate body, or on all the walls that define the peripheral edge of the plate body.

Another subject of the invention is an alternative embodiment, in which the white-LED devices are used to illuminate from outside a panel bearing the image to be displayed, the said panel having diffusing prisms in points corresponding to selected areas of the image, shaped in such a way as to produce a predefined solid angle of light diffusion, the central axis of which is inclined with respect to an axis normal to the panel. This characteristic is exploited for panels designed to be arranged vertically in order to orient downwards the light rays diffused by the diffusing prisms arranged on the panel. This alternative solution is characterized by a higher overall efficiency, which enables a minimal number of LEDs to be used and by the fact that it does not require the use of a costly transparent plate.

In the said embodiment, a lens, preferably operating in total internal reflection and set in front of the LED, enables angular control of the light beam that is incident on the panel. A prism or, alternatively, a reflector, makes it possible to direct the portion of the light beam that diverges in the opposite direction towards the panel.

BRIEF DESCRIPTION OF THE DRAWINGS

Further characteristics and advantages of the present invention will emerge from the ensuing description, with reference to the attached drawings, which are provided purely to furnish non-limiting examples, and in which:

FIG. 4 is a schematic sectional view according to the line IV—IV of FIG. 2;

FIG. 5 is a perspective schematic view of a further embodiment of the invention;

FIG. 5a illustrates a detail of FIG. 5 at an enlarged scale;

FIG. 6 is a sectional view according to the line VI—VI of FIG. 5; and

FIGS. 6a, 6b, and 6c illustrate three variants.

DETAILED DESCRIPTION OF THE INVENTION

Figure 2:
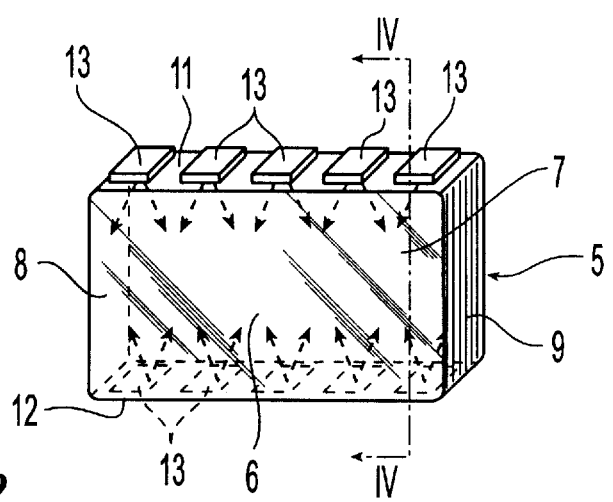
FIG. 2 is a schematic view of an embodiment of the device according to the invention.
Figure 3:
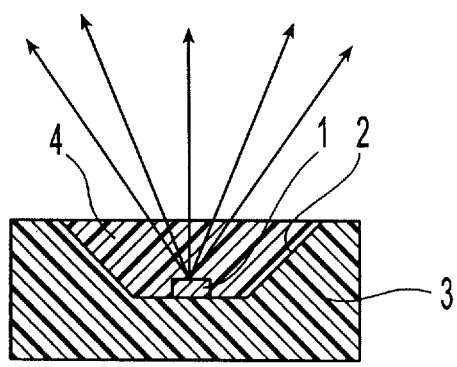
FIG. 3 is a schematic sectional view, at an enlarged scale, of a white-light emitting LED device according to the prior art.

With reference to FIG. 2, the device according to the invention has a body 5 in the form of a plate with two larger faces 6, 7, two end walls 8, 9, and two longitudinal walls 11, 12. The plate body 5 is made of polymethyl acrylate or polycarbonate. In the example illustrated, on the two longitudinal walls 11, 12 are applied two sets of white-light emitting LEDs 13 of the SMD type, supplied by means of a common channel. The constructional details of these devices and the details regarding the mode in which they are supplied are not illustrated herein in so far as they may be made in any known way.

Figure 1:
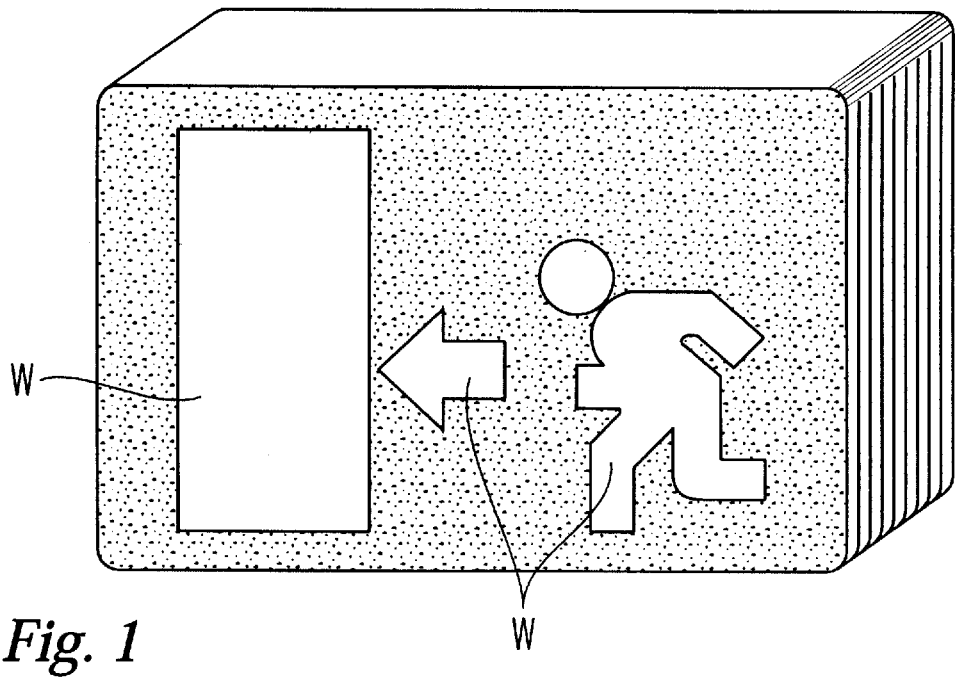
FIG. 1 illustrates, as an example, a luminous signalling panel of the type to which the present invention is applicable.

With reference to FIG. 4, each LED 13 emits, within the body 5, a cone of light 14. The arrangement is such that the light rays emitted by the LED 13 encounter the walls of the plate body 5 at an angle A greater than the angle of total internal reflection $A_{TIR}$. Consequently, the light rays undergo a succession of total reflections inside the plate body 5, which thus functions as a light guide. On the larger face 6 the image that may be seen in FIG. 1 is formed by silk-screen printing. In areas corresponding to the selected areas W characterized by a white shape, the surface of the plate body 5 is formed by moulding or pressing (for instance by injection moulding or by hot pressing) with a distribution of diffusing optical elements 15, for example in the form of diffractive or refractive lenses. Consequently, these lenses partially diffuse outwards, as indicated in FIG. 4 by the arrows 16, the light rays that impinge on said elements from inside the plate body 5.

In the example illustrated, the white LEDs 13 are set on two opposite walls of the plate body 5. They could also be set on a single wall, or else on all four walls 8, 9, 11, 12 which define the peripheral edge of the plate body 5. In any case, the walls that are possibly without LEDs 13 are provided with a reflective coating.

FIG. 5 illustrates a variant in which a panel 20 carrying the silk-screen printed image is illuminated from outside by a plurality of white LEDs 21 supported by corresponding supports 22, As may be clearly seen in FIG. 6, each LED 21 directs its own cone of light onto a selected area, in the example in question an area W of the panel. In such areas (see detail of FIG. 5a), the panel has prisms that diffuse the cone of light emitted by the LEDs in a solid angle A of light diffusion, the axis of which 23 is inclined with respect to an axis normal to the panel 20, so as to maximize the efficiency of the device, which is designed to be viewed from below.

FIGS. 6a, 6b, and 6c illustrate three different types whereby it is possible to shape the beam emitted directly by the LEDs into a new light beam having controlled divergence and direction, so as to maximize uniformity of lighting of the symbols and luminous efficacy defined as the ratio between the flux of light reflected and diffracted by the device and the flux emitted by the LEDs. This result is achieved by setting a lens (FIG. 6a), or a prism (FIG. 6b), or a mirror (FIG. 6c) in front of the LED.

Of course, without prejudice to the principle of the invention, the details of construction and the embodiments may vary widely with respect to what is described and illustrated herein purely for the purpose of providing an example, without thereby departing from the scope of the present invention.

What is claimed is:

1. A luminous signalling device comprising:
    a body made of transparent synthetic material, basically in the form of a plate having two larger faces set opposite to one another, at least one of which bears an image, two end walls, and two longitudinal walls;
    a plurality of LED devices, part of which designed to emit white light, and part of which designed to emit green light, externally coupled to at least one of said end walls or said longitudinal walls, the arrangement being such that the rays of white light coming out of said LED devices undergo multiple total reflections within the plate body, which thus functions as a light guide; and
    a distribution of diffusing, diffractive optical elements formed on the face bearing the image in areas corresponding to selected areas of the image designed to diffuse outwards the rays of light that are incident on said areas from within the plate.

2. A device according to claim 1, wherein said body is made of a material chosen from between polymethyl methacrylate and polycarbonate.

3. A device according to claim 1, wherein each LED device comprises a LED that emits blue light associated to an epoxy-resin matrix englobing multicolour phosphors.

4. A device according to claim 3, wherein said LED devices have a light-emission cone with a 60°×30° divergence.

5. A device according to claim 1, wherein said LED devices are applied to the plate body by means of a layer of glue.

6. A device according to claim 1, wherein said diffusing optical elements are diffractive or refractive lenses.

7. A device according to claim 1, wherein said diffusing optical elements are formed by moulding or pressing (for example by injection moulding or hot pressing) on the face of the plate body of the device.

8. A device according to claim 1, in which said image presents a lighter-coloured shape on a darker background, and wherein said diffusing optical elements are formed in areas corresponding to the light-coloured shape.

9. A device according to claim 8, wherein it comprises diffusing optical elements also in areas corresponding to the dark background of the image.

10. A device according to claim 1, wherein the device is provided with the image on both larger faces.

11. A device according to claim 1, wherein it presents the image on a single face and is provided with a reflecting coating on the opposite face.

12. A device according to claim 1, wherein it is provided with LEDs on a single wall of the body, or on two opposite walls of the body, or on all four walls of the body, and moreover has a reflecting coating on the walls of the body that are without LEDs.

13. A device according to claim 1, wherein the aforesaid image is obtained by means of silk-screen printing.

14. A luminous signalling device comprising a panel bearing an image, said panel being formed with diffusing prisms in areas corresponding to selected areas of the image, and a plurality of white-light emitting LEDs supported in such a way that they diffuse the corresponding cones of light on said selected areas of the image, said diffusing prisms having a solid angle of light diffusion, the central axis of which is inclined with respect to an axis normal to the panel.

15. A device according to claim 14, wherein in front of each LED device is set a means, consisting of a lens, a prism, or a reflector, for shaping the beam emitted.

* * * * *